United States Patent [19]

Lounsbury

[11] Patent Number: 5,104,328
[45] Date of Patent: Apr. 14, 1992

[54] ANATOMICAL MODEL

[76] Inventor: Katherine L. Lounsbury, 14309 NE. Woodinville/Duvall Rd., #C-21, Woodinville, Wash. 98072

[21] Appl. No.: 510,530

[22] Filed: Apr. 18, 1990

[51] Int. Cl.$^5$ .................... G09B 23/30; G09B 23/34
[52] U.S. Cl. ................................. 434/273; 434/267
[58] Field of Search .............. 434/273, 272, 267, 262

[56] References Cited

U.S. PATENT DOCUMENTS

| | | | |
|---|---|---|---|
| 344,270 | 4/1886 | Yaggy | 434/269 |
| 396,381 | 1/1989 | Yaggy | 434/269 |
| 411,816 | 10/1889 | Lee | 434/272 |
| 421,833 | 2/1890 | Henckel | 434/269 |
| 2,287,568 | 6/1942 | Jue | 434/269 |
| 2,288,296 | 6/1942 | Munro | 434/272 |
| 2,495,568 | 6/1950 | Coel | 434/272 |
| 2,678,505 | 5/1954 | Munson | 434/272 |
| 2,704,897 | 3/1955 | Lade | 434/272 |
| 2,763,070 | 9/1956 | McCormick | 434/273 |
| 3,213,550 | 10/1965 | Kittner | 434/273 |
| 3,704,529 | 12/1972 | Cioppa | 434/272 |
| 3,824,709 | 7/1974 | Knapp et al. | 434/273 |
| 4,197,670 | 4/1980 | Cox | 446/369 |
| 4,288,222 | 9/1981 | Kling | 434/272 |
| 4,494,936 | 1/1985 | Stickles | 434/273 |

FOREIGN PATENT DOCUMENTS 2060412  5/1981  United Kingdom ............... 434/273

Primary Examiner—Richard J. Apley
Assistant Examiner—Rachel M. Healey
Attorney, Agent, or Firm—Hughes & Multer

[57] ABSTRACT

Anatomical models which represent the female abdominal area and include components simulating the layers of tissue in the abdominal area, the female reproductive organs, and the bladder. A simulated baby, umbilical cord, and placenta are also preferably included; and the tissue layer-representing components are provided with closures so that the dissecting and subsequent repairs of the tissue layers in surgical procedures can be simulated. The models are used to train professionals involved in such surgical procedures as caesarean sections, tubal ligations, and oophorectomies (the excisional removal of ovaries) and to educate and inform persons, prospective parents, and others—both professionals and nonprofessionals—e.g., with respect to such procedures.

12 Claims, 5 Drawing Sheets

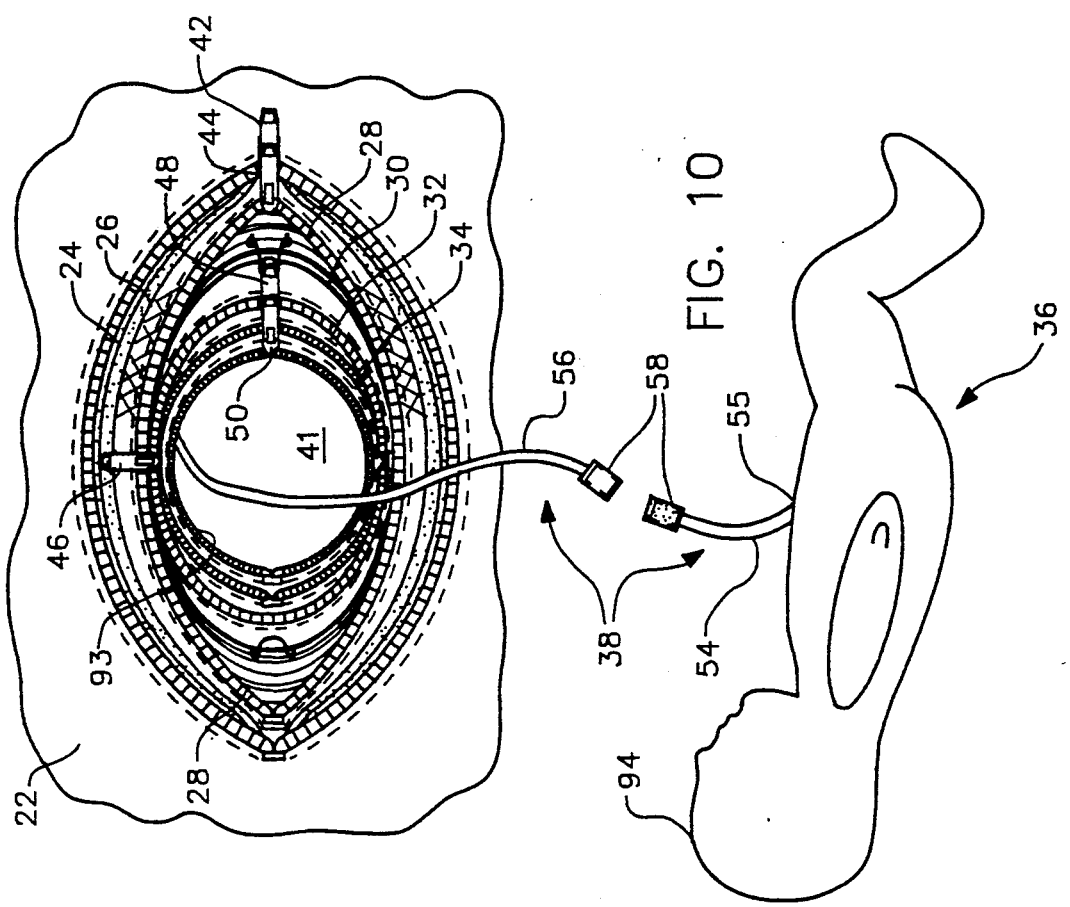

ANATOMICAL MODEL

TECHNICAL FIELD OF THE INVENTION

In one aspect, the present invention relates to a novel, anatomical model of a pregnant woman's abdomen, this model having: superimposed laminar components which simulate the layers of tissue that must be breached to reach the uterine cavity; simulations of the fetus, placenta, and umbilical cord; and components simulating the bladder and the other reproductive organs —viz., the ovaries and fallopian tubes.

In a second aspect, the present invention relates to novel methods of using anatomical methods as described in the preceding paragraph to train professionals such as obstetrical and gynecological surgeons, physician's assistants, and scrub nurses and to inform and educate pregnant women and those close to them in the intricacies and complexities of a caesarean section and other surgical procedures in which a woman's abdomen is opened to reach the reproductive organs.

The present invention can be used to particular advantage in training scrub nurses in the duties expected of them in the course of a caesarean section, and the principles of the invention will accordingly be developed herein primarily with respect to that application of the invention in the interest of clarity and brevity. This approach, however, is not intended to limit the scope of the protection sought in the appended claims or to imply that other applications of the invention are less important.

BACKGROUND OF THE INVENTION

As indicated above, one of the currently important applications of the present invention is its use in training scrub nurses to perform the tasks expected of them in the course of caesarean sections and other surgical procedures involving the female reproductive organs. The demands on the scrub nurse are many and exacting, and considerable training is required before a nurse can satisfactorily perform them. The scrub nurse must be familiar with the instruments employed and with anatomical structure so that she or he can place the correct instrument in the surgeon's hand in response to an appropriate hand movement at each step; i.e., without the surgeon having to name the instrument he or she wants. The scrub nurse must also know how: to apply suction and retraction, to irrigate the wound when asked, and to prepare and hand distinctly different sutures to the surgeon as the several different tissue layers are repaired. Also, the scrub nurse is responsible for: removing snipped off pieces of sutures from the wound, keeping an adequate supply of sponges at hand, replacing saturated sponges without direction, making sponge and needle counts, etc. All of these tasks must be accomplished precisely, without mistake, and rapidly (in a caesarean section, for example, the baby is often delivered in as few as three minutes after the first incision is made).

Quite aside from the foregoing, the scrub nurse is responsible for directing activities of the circulating nurse. For example, the scrub nurse must ensure that the circulating nurse has needed instruments not in the obstetrical pack on the instrument table when they are required.

At the present time, the accepted way to train a scrub nurse in the foregoing and other tasks is to have the nurse observe and perhaps assist to a very limited extent in actual surgical procedures This is time consuming and expensive because the nurse must be paid while she is trained. Also, observation does not have the widely recognized benefits of hands on training. Thus, it will be apparent to the reader that there are definite disadvantages to the presently employed techniques for training scrub nurses in the duties they are expected to perform in caesarean sections and other surgical procedures involving female reproductive organs.

The same is true of the procedures currently used to train such professionals as physicians assistants and, to some extent, obstetrical and gynecological surgeons. Considerable reliance is placed on observation, which is no substitute for hands on experience, and on the dissection of cadavers. These are chronically in short supply and, furthermore, can not be used to train one to perform or assist in a caesarean section for obvious reasons.

Training of the professional to a high level can not be avoided. Lack of adequate training would be clear evidence of malpractice if a patient were injured during the procedure being performed.

Another area in which satisfactory techniques are currently lacking is that of educating prospective parents, their relatives, and other involved parties in the intricacies of a caesarean section.

This information is imparted in childbirth classes by way of a film or a video presentation. However, the information is too unfamiliar and presented too quickly by these techniques for more than a small part of it to be grasped. Also, in a doctor's office, pertinent information, if given at all, is typically imparted by way of a short, verbal explanation, usually to a patient who is unfamiliar with the subject and the terminology used by the doctor. Thus, the currently employed techniques for making information on caesarean sections available to pregnant women and other non-professionals who should have it are also to a large degree unsatisfactory.

The same approaches are currently employed, with the same disadvantages in other situations—for example, in the continuing education and retraining courses conducted by hospitals and colleges.

Previously issued U. S. patents are concerned with charts, models, films, and dolls in which internal organs and other anatomical structures are represented. Those patents in this category of which I am aware are: Patent

| U.S. Pat. No. | Patentee | Issue Date |
|---|---|---|
| 340,270 | Yaggy | 20 April 1886 |
| 396,381 | Yaggy | 15 January 1889 |
| 411,816 | Lee | 1 October 1889 |
| 421,833 | Henckel | 18 February 1890 |
| 2,287,568 | Jue | 23 June 1942 |
| 2,288,296 | Munro | 30 June 1942 |
| 2,678,505 | Munson | 18 May 1954 |
| 4,197,670 | Cox | 15 April 1980 |
| 4,288,222 | Kling | 8 September 1981 |

Charts and similar representations as disclosed in Yaggy '270, Yaggy '381, and Henckel are informative but are not comparable to the novel anatomical models disclosed herein. The dissecting and subsequent repair of layers of abdominal tissue can not be realistically simulated with a chart. Nor can such other procedures as the delivery of a caesarean section baby, the subsequent cleaning of the uterus, tubal ligation, a hysterectomy, or an ocphroctomy be realistically simulated with a chart.

Anatomical models and dolls, such as those disclosed in the Lee, Munro, Munson, Cox, and Kling patents can likewise not be employed to realistically simulate an actual surgical procedure. For example, no provision is made for simulating the several layers of tissue which must be dissected to reach the abdominal cavity, let alone the simulating of the actual dissection and subsequent repair of those layers of tissue. Also, the patented models and dolls would not be suitable for my purposes as the female reproductive organs and the baby, placenta, and umbilical cord of an expectant mother are not represented.

The filmed approach, to which the cited Jue patent is devoted, is equally deficient. The pace of the presentation can not be varied, and this approach does not allow for participation by the person(s) being trained or informed. And specialized equipment such as projectors and monitors and special areas for showing the film (or its video counterpart) are required.

SUMMARY OF THE INVENTION

I have now invented, and disclosed herein, certain new and novel methods for training scrub nurses, physicians assistants, surgeons, and other professionals in the intricacies of caesarean sections and other surgical procedures involving female reproductive organs and for educating both professionals and non-professionals such as pregnant women and those close to them in these matters, especially in the delivery of a baby by caesarean section.

These methods make use of a novel anatomical model in which the different layers of tissue in the abdominal area are realistically represented as are the female reproductive organs—uterus, fallopian tubes, and ovaries. And, represented because of its proximate relationship to the uterus and the consequent danger of damaging it in cutting through to the patient's uterus, is the bladder. Also preferably included in the anatomical model are a simulated baby and a simulated placenta and umbilical cord. These components of the model allow the delivery of the baby from the dissected uterus to be realistically simulated as well as the subsequent clamping and severing of the umbilical cord, the removal of the placenta from the uterine cavity, and the relocation of the uterus from the abdominal cavity to the external surface of the abdomen to facilitate the repair of that organ.

Each of the anatomical model components representing a layer of tissue has a zipper (or comparable closure) which is of the same length as the incision made in the tissue layer simulated by that component and oriented and located like the actual incision. This closure allows the component to be parted, realistically simulating the incision, and then rejoined, simulating the subsequent repair of the tissue layer simulated by the component.

Each of the components of the anatomical model is colored and textured to closely approximate the anatomical structure it represents. And the umbilical arteries and vein are simulated in the umbilical cord so that the function of those important blood vessels can easily be explained. Also, Velcro or comparable fasteners are employed to join together two segments of the umbilical cord which are respectively attached to the baby and the placenta. This allows the above-mentioned clamping and severing of the umbilical cord in a delivery by caesarean section to be realistically imitated.

This novel model allows a scrub nurse or other professional to review over and over, until totally familiar, the steps involved in a surgical procedure such as a caesarean section and the instruments that are employed. Also, the model provides a hands on approach unlike conventional visual approaches -- observation of an operation, a film, or a video. Furthermore, the training is not tied to an operating theater or to a particular time. Instead, the person undergoing training can simply practice or review with the model as time permits and at a pace he or she finds the most beneficial.

Similarly, in childbirth classes and other settings—for example, the continuing education classes conducted by hospitals and colleges and in doctor's offices—the anatomical model provides for hands on instruction, realistic presentation of a procedure, and teaching at a pace suited to a particular person or audience. Also, a specialized setting such as an operating theater and specialized equipment such as a projector and screen or VCR and monitor are not required. Furthermore, an opportunity for questions to be asked at any stage is provided.

The novel methods disclosed herein are, in fact, particularly beneficial to doctors because it has been demonstrated that a well-informed patient is less apt to sue for malpractice if something goes awry during surgery.

Yet another advantage of the novel anatomical models disclosed herein is that they, and the steps they are designed to simulate, are presented in a manner which is inoffensive and non-frightening or repulsive as may be a film or video of an actual surgical procedure in which the abdomen is opened, for example. Thus, the use of the novel model disclosed herein is particularly appropriate in childbirth classes attended by young siblings, for example.

Quite aside from the foregoing, the novel anatomical models disclosed herein have the advantage that they can be used to advantage in describing non-surgical matters such as the anatomy of the female reproductive organs, a tubal pregnancy, and the abnormality which leads to that condition.

OBJECTS OF THE INVENTION

From the foregoing, it will be apparent to the reader that one important and primary object of the present invention resides in the provision of novel, improved anatomical models which realistically simulate the layers of tissue in the abdominal region and the female reproductive organs.

A related, also important and primary object of the invention is the provision of anatomical models as characterized in the preceding paragraph which also include a simulated baby, placenta, and umbilical cord.

Other, also important, but more specific objects of the invention reside in the provision of anatomical models as characterized in the preceding paragraphs which:

have components that realistically simulate corresponding anatomical structures;

have closures that allow tissue layer-simulating components to be parted to thereby simulate the dissection of the simulated tissue layer and then closed to simulate the subsequent repair of that layer of tissue;

which have a simulated umbilical cord that can be separated to simulate the clamping and cutting of an actual umbilical cord and has simulated umbilical arteries and vein; and are so constructed that they can be used an indefinite number of times.

Yet another important and primary object of the present invention resides in the provision of instructional and educational methods which employ anatomical models as characterized in the preceding objects.

Other important objects and features and additional advantages of the invention will be apparent to the reader from the foregoing and the appended claims and as the ensuing detailed description and discussion proceeds in conjunction with the accompanying drawing.

BRIEF DESCRIPTION OF THE DRAWING

In the drawing:

FIG. 4 is a partial plan view of the anatomical model with a topmost layer of the model parted to simulate the dissecting of the epidural tissue layer and the underlying layer of adipose tissue and the consequent exposing of the fascia, that layer of fibrous tissue overlying the abdominal muscles;

FIG. 5 is a view, similar to FIG. 4, with the fascia-simulating component of the anatomical model parted to simulate the dissecting of that layer and the exposing of the underlying layer of muscle tissue; viz., the two abdominus rectus muscles which extend upwardly from the pelvis toward the sternum in side-by-side relationship and are joined by a thin layer of connective tissue;

FIG. 10 is a partial plan view and exploded view of the anatomical model with the uterus-representing component parted, the baby removed from the thus assessed uterine cavity, and a simulated severing of the umbilical cord completed;

DETAILED DESCRIPTION OF THE INVENTION

Figure 1:
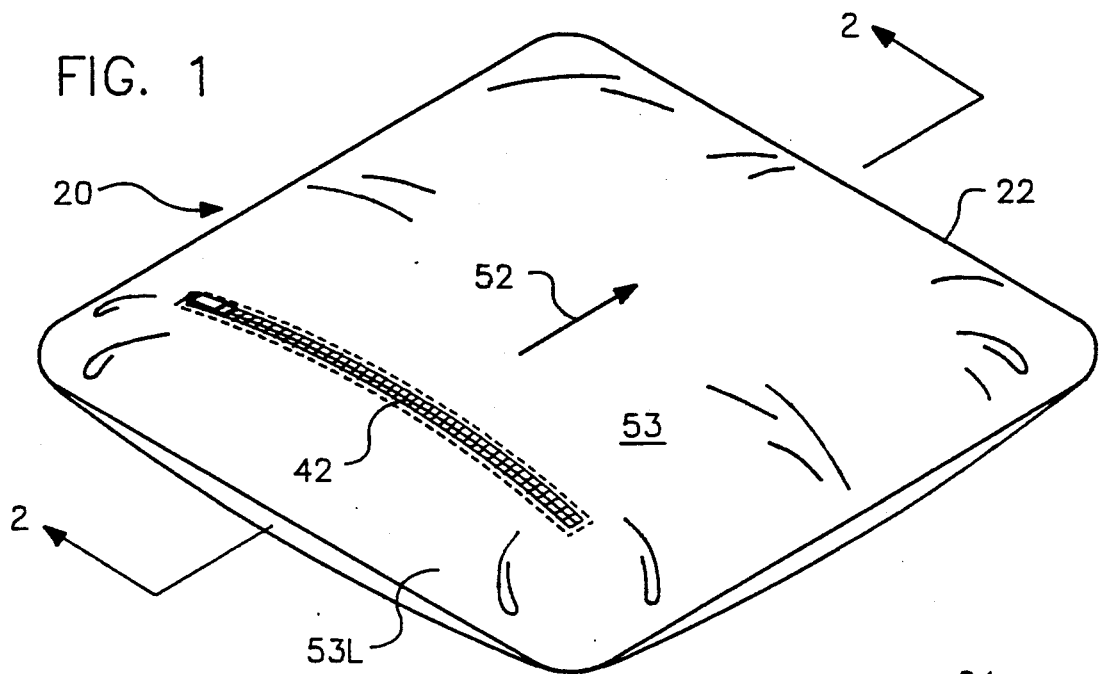
FIG. 1 is a pictorial view of an anatomical model embodying the principles of the present invention.
Figure 2:
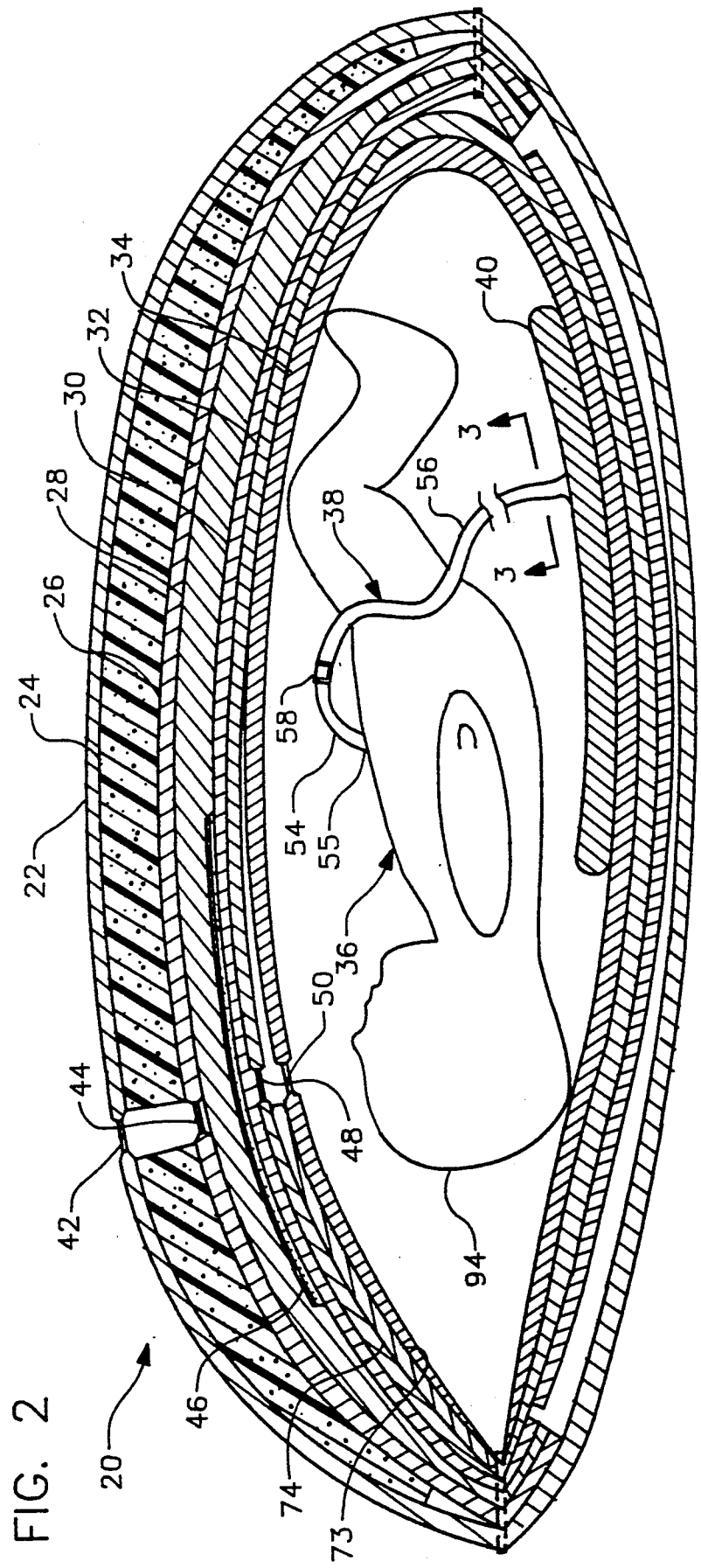
FIG. 2 is a section through the anatomical model of FIG. 1, taken substantially along line 2—2 of the latter figure.
Figure 6:
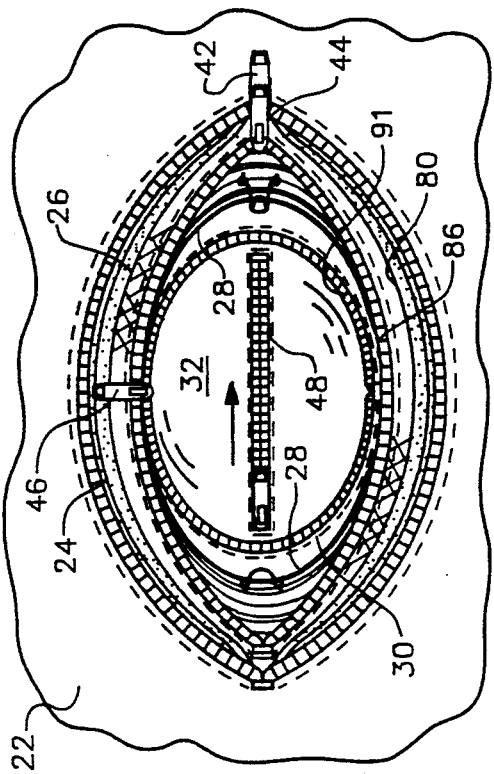
FIG. 6 is a view, similar to FIG. 5, but with those components of the anatomical model representing the abdominus rectus muscles separated to expose the peritoneum as is done in an actual surgical procedure by rupturing the connective tissue between them and then pushing or pulling the muscles apart.

Referring now the drawing, FIGS. 1 and 2 depict an anatomical model 20 constructed in accord with, and embodying, the principles of the present invention. This model is designed to realistically represent a woman's abdominal area and to present, also in realistic form, the several layers of abdominal tissue; the female reproductive organs; the abdominal and uterine cavities; and, preferably, a baby, placenta, and umbilical cord.

Thus, anatomical model 20 includes components or layers 22... 34 which respectively, and realistically, simulate the skin or epidural layer, the underlying layer of adipose tissue, the fascia, the abdominus rectus muscles, the outer peritoneum, the visceral peritoneum, and the uterus. The baby, umbilical cord, and placenta are also illustrated in FIG. 2 and identified by reference characters 36, 38, and 4; these components can be placed in and removed from the simulated uterine cavity or womb 41.

As indicated previously, each of those components 22 ... 34 simulating a layer of abdominal tissue (and the uterus) is made from a material textured and dimensioned as to realistically represent the anatomical structure it simulates. As examples, the component 24 simulating the layer of adipose tissue may be fabricated from a relatively thick layer of foam; the component 28 simulating the abdominus rectus muscles from a red, ribbed material; and the component 33 simulating the visceral peritoneum (or bladder flap) from a thin, almost transparent fabric.

A zipper is provided in each of those anatomical model components 22, 26, 30, 32, and 34 representing a layer of tissue that is dissected by instrument in a surgical procedure of the type with which this specification is concerned. An additional zipper is provided in that component 34 representing the woman's uterus. These zippers are best shown in FIGS. 2-10 in which they are identified by reference characters 42 ... 50.

Zippers 42...50 allow the components in which they are incorporated to be: (a) parted, thus realistically simulating an incision in the simulated layer; and (b) thereafter rejoined, again in a manner realistically simulating the subsequent repair of the dissected layer. To this end, each of the zippers is dimensioned in length, oriented, and otherwise located to closely duplicate the simulated incision. Thus, zippers 42, 44, 48, and 50 in those components 22, 26, 32, and 34 simulating the epidural layer, the fascia, the visceral peritoneum, and the uterus are transverse; i.e., oriented at right angles to the line between the pelvis and sternum and depicted by arrow 52 in FIG. 1 and toward the lower end 53L of the simulated abdomen 53 (the classical lower transverse incision or bikini cut). The remaining zipper 46 in the component 30 simulating the outer peritoneum is oriented in the pelvis-to-sternum direction of arrow 52. Also, as is apparent from FIG. 2, the zippers 42, 44, 48, and 50 are aligned in the same, generally superimposed relationship as the actual incisions they are employed to simulate.

The component 28 simulating the abdominus rectus muscles, unlike the remaining tissue simulating components, is not equipped with a zipper. This is because these two muscles, which extend in the pelvis-sternum direction indicated by arrow 52, are joined only by a thin layer of connective tissue. In the surgical procedure, these two muscles can simply be pulled apart.

Referring still to FIG. 2, the anatomical model component 38 simulating an umbilical cord has two segments. One of these, identified by reference character 54, is attached to the navel of simulated baby 36. The other, identified by reference character 56, is attached to the placenta-simulating component 40 of model 20 These two segments 54 and 56 of the simulated umbilical cord are connected by a Velcro or comparable fastener 58. This allows the two segments to be disconnected, realistically simulating the steps of clamping and severing the umbilical cord of a baby delivered by caesarean section.

Figure 3:
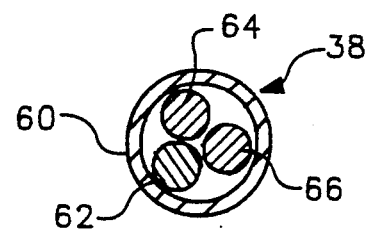
FIG. 3 is a section taken substantially along line 3—3 of FIG. 2 to show the details of a simulated umbilical cord incorporated in the anatomical model.

Also, as is shown in FIG. 3, umbilical cord-simulating component 38 includes a tubular covering 60 surrounding cords 62, 64, and 66. These respectively represent the vein which carries oxygenated blood to the fetus and the arteries which return deoxygenated blood from the fetus to the mother's circulatory system. Cord 62 is accordingly colored red, and cords 64 and 66 are colored blue.

Figure 12:
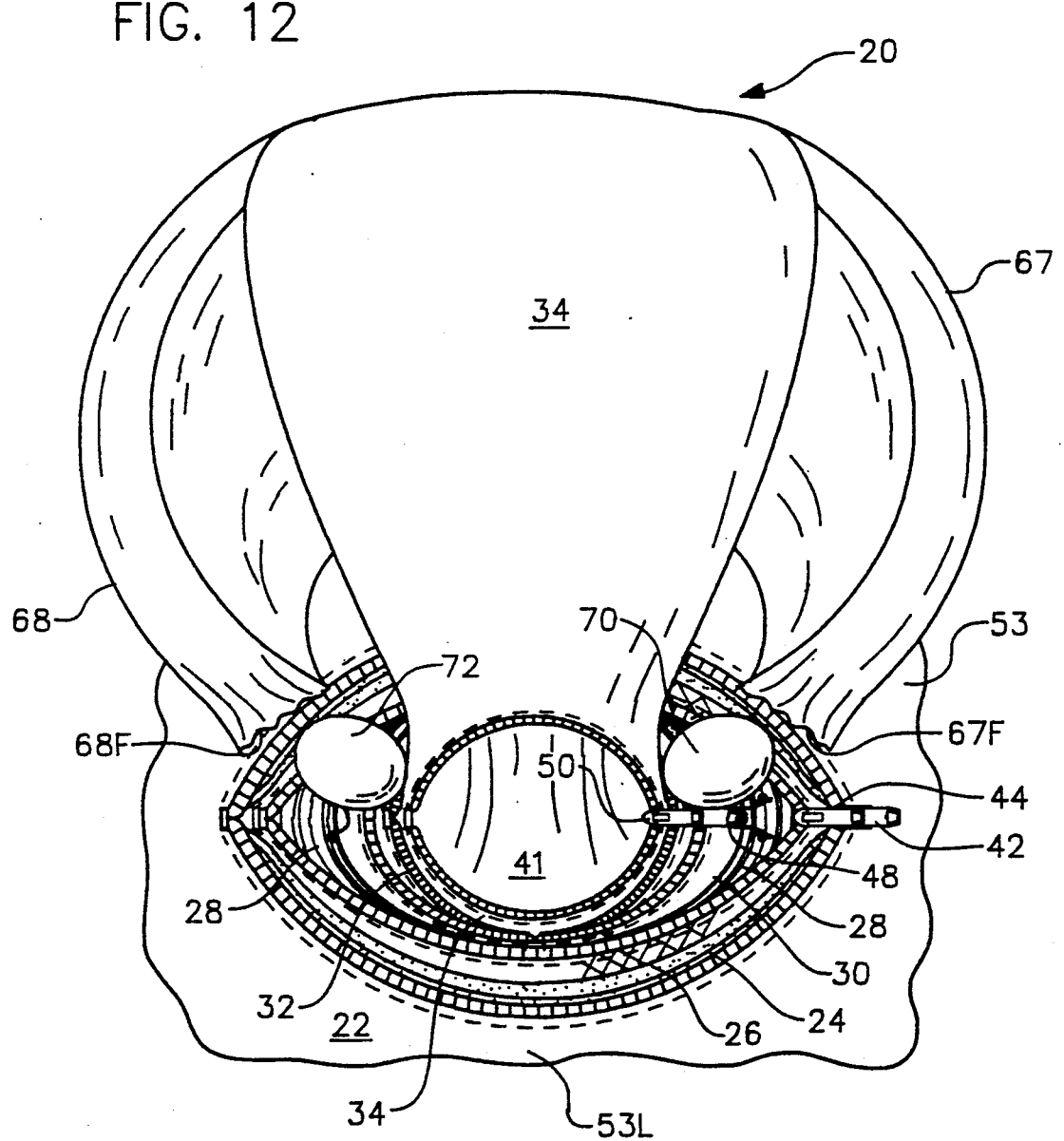
FIG. 12 is a partial plan view of the anatomical model as it appears after the placenta-simulating component has been removed from the uterine cavity and the uterus removed from the abdominal cavity and laid on the patient's abdomen as is done in a caesarean section to facilitate the repair of the uterus; this figure also shows components incorporated in the anatomical model to simulate the ovaries and the fallopian tubes and the anatomical relationship between the fimbria (lower ends of the fallopian tubes) and the ovaries.

Incidental to a caesarean section, one or more additional procedures involving female reproductive organs may also be performed For example, a tubal ligation or a partial or complete hysterectomy may be performed, or a diseased ovary or one bearing a cyst may be removed So that the reproductive organs other than the uterus can be visualized, they are also represented in anatomical model 20. Thus, included in this model and best shown in FIG. 12, are components 67 and 68 simulating the left and right fallopian tubes with their fibria 67F and 68F (which receive the ova from the ovaries) and components 70 and 72 simulating the left and right ovaries, all in the correct relationship to each other.

It was also pointed out above that a woman's bladder is closely proximate her uterus. There is consequently a danger that the bladder will be nicked when the visceral peritoneum is dissected to expose the uterus. So that this danger can be demonstrated, and consequently avoided, a component representing the female bladder is also incorporated in anatomical model 20 and located in simulated abdominal cavity 73. This component is identified by reference character 74.

As will be apparent to the reader, and as was discussed above, one important surgical procedure which anatomical model 20 can advantageously be employed to simulate is the delivery of a baby by caesarean section. How this representative procedure is simulated is shown in stepwise form in FIGS. 2-10.

The initial step which anatomical model 20 can be employed to realistically simulate is the dissection of the epidural layer and the underlying adipose tissue. This step is simulated with anatomical model 20 by opening the zipper 42 (see FIG. 4). That parts those edges 76 and 78 of components 22/24 on opposite sides of zipper 42 and forms a gap 80 which represents the incision made in the surgical procedure being simulated.

At the same time, the instruments employed by the surgeon can be discussed, handled, reviewed, etc.; and ancillary procedures can also be discussed and reviewed. These include, as examples, the tying off or cauterization of bleeders and the use of cautery instead of a knife or scalpel to cut through the layer of adipose tissue (a card laying out the technique employed by a particular surgeon at different stages of a given surgical procedure are made available to the scrub nurse and the others concerned in advance of the operation).

Once the bleeders have been cauterized or tied off, the surgeon holds the fibrous fascia with pickups and makes an incision in this layer of tissue, typically with Mayo scissors This step is simulated with anatomical model 20 by opening zipper 44. This allows the edges 82 and 84 of fascia simulating, anatomical model component 26 to pull apart, producing a gap 86 which realistically simulates the incision made by the surgeon. Again, and as this is done, the procedure and instruments can be reviewed, demonstrated, and discussed.

Underlying the fascia, as shown in FIGS. 2 and 5, are the abdominus rectus muscles. The next step in the surgical procedures of concern is the separation of the fascia from these muscles. This is typically done by employing a Kocher hemostat to grasp the fascia and Mayo scissors to separate the fascia from the connective tissue that holds the abdominus rectus muscles together at midline. Once again, anatomical model 20 greatly facilitates the visualization of this step, the instruments employed, etc.

The next step in a caesarean section or other surgical procedure which anatomical model 20 is designed to simulate is the pulling apart of the abdominus rectus muscles as indicated by arrows 88 and 90 in FIG. 5. This step can be simulated as well as the actual spreading of the two muscles as shown by arrows 88 and 90.

The next step in the surgical procedure being simulated is the dissection of the outer peritoneum, which is exposed in the preceding step. Dissection of the peritoneum is simulated in anatomical model 20 by opening zipper 46 which is oriented in the pelvis-to-sternum direction (see FIGS. 2 and 6) to simulate the actual incision. This is represented by gap 91 in FIG. 7.

Figure 7:
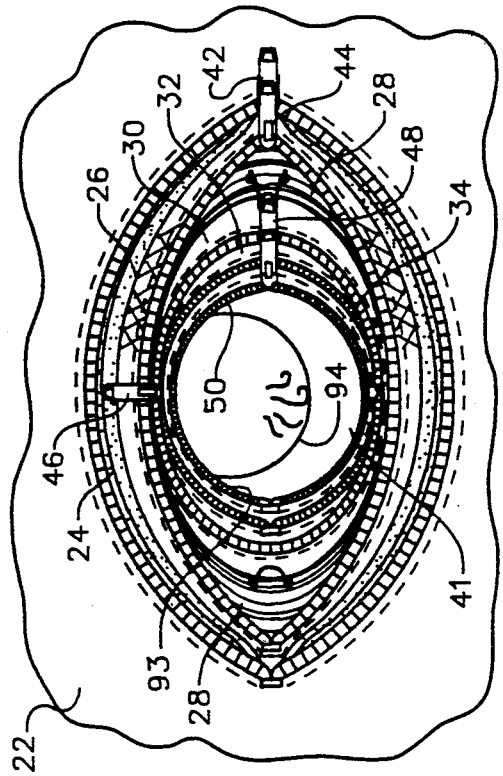
FIG. 7 is a view, similar to FIG. 6, with that component of the anatomical model representing the outer peritoneum parted to expose a component simulating the visceral peritoneum (or bladder flap)

In the actual procedure, pickups are employed to hold the peritoneum while it is cut, typically with Metzenbaum scissors The manner in which these instruments are employed can be readily visualized with anatomical model 20 as is apparent from FIG. 7; and the instruments can be demonstrated, manipulated, reviewed, etc.

Underlying the outer peritoneum is the visceral peritoneum or bladder flap. This is a very thin layer of tissue through which the internal organs can be seen. The component simulating this layer is consequently fabricated from a thin, porous, semitransparent fabric as was mentioned above.

Figure 8:
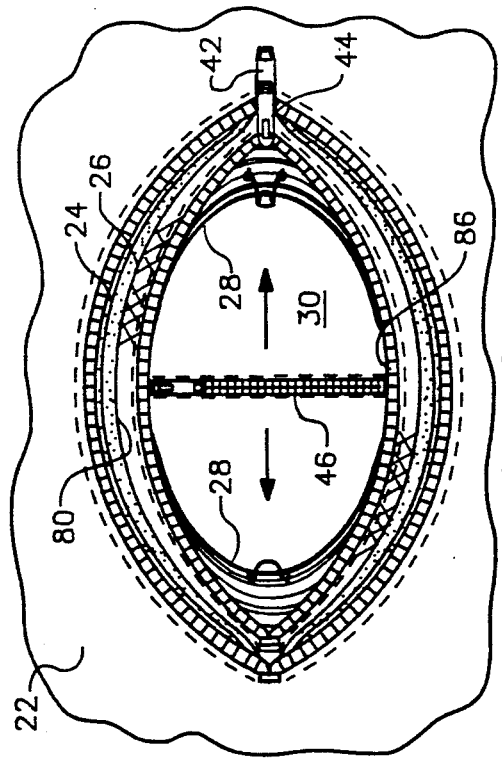
FIG. 8 is a view, similar to FIG. 7, with that component of the anatomical model representing the visceral peritoneum parted to expose components of the anatomical model representing the uterus and the bladder.

Because the bladder flap adheres to the internal organs, the same combination of pickups and Metzenbaum scissors is employed to dissect this tissue layer, exposing the uterus and bladder In anatomical model 20, this step is simulated by opening zipper 48 (see FIGS. 7 and 8); and the gap simulating the incision is identified in FIG. 8 by reference character 92.

As is apparent from FIG. 8 and was mentioned above, bladder 74 is immediately adjacent uterus 34. This relationship is accurately represented in anatomical model 20, and the latter accordingly allows one to visualize the care that must be taken in cutting through the bladder flap and the importance of draining the bladder with a catheter so that the incision in the bladder flap can be made as safely as possible.

As is also shown in FIG. 8, the uterus is exposed once the bladder flap has been dissected. In the representative caesarean section, the next step is to dissect the uterus itself. Typically, this will be initiated by nicking the uterus with a sterile knife and then using bandage scissors to complete the incision or the blunt handle of a knife to separate the layer of uterine tissue. If the caesarean section has been preceded with prolonged labor and the uterus has consequently been thinned by repeated contractions, this use of a blunt knife handle or blunt scissors avoids injury to the baby. This is particularly important in a normal presentation in which the baby's face is directly below the incision.

Figure 9:
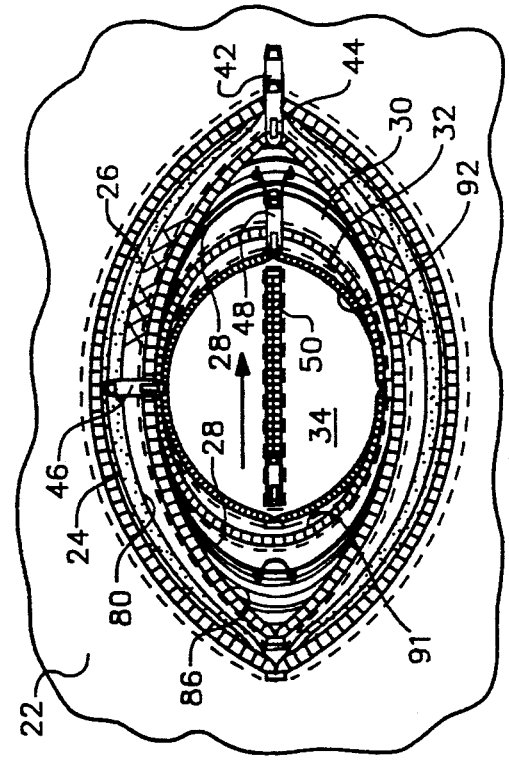
FIG. 9 is a view, similar to FIG. 8, with an anatomical model component representing the uterus parted to simulate the dissection of the uterus.

The just-discussed step of dissecting the uterus is simulated in anatomical model 20 by opening zipper 50 (see FIGS. 8 and 9). Gap 93 in component 34 realistically simulates the incision.

The just-described step exposes the head 94 of the simulated, normally presented baby 36 as is shown in FIG. 9.

The next step in a caesarean section is the delivery of the baby. Typically, this is accomplished by the surgeon pulling on the head (or any other available part) of the baby and the surgeon's assistant pressing down and toward the pelvis on the upper part of the mother's abdomen This helps to move the baby in the direction in which the surgeon is pulling.

It is common for the baby to be in a position other than that shown in FIG. 9 In this case, the surgeon must also turn and otherwise manipulate the baby to deliver it.

As is readily apparent from FIG. 2, anatomical model 20 is so constructed that the simulated baby 36 of that model may be oriented in any position which an actual baby might be found Thus, that model can be employed to simulate the delivery by caesarean section of abnormally presented babies as well as those which are normally presented.

Once the baby has been delivered from the womb, the baby's face is wiped and liquids suctioned from the baby's mouth and nose. Here again, these are steps which can be realistically simulated with anatomical model 20. So can succeeding steps in which the baby's umbilical cord is first clamped as with Kelly hemostats and then severed, typically with the bandage scissors. The Velcro fastening 58 between the two segments 54 and 56 of simulated umbilical cord 38 allows these steps to be readily visualized along with the instruments employed and the manner in which they are used (see FIG. 10).

At this stage in the procedure, the baby is typically taken to the warmer; and the clamp on that segment of the umbilical cord attached to the as yet undelivered placenta loosened so that blood will flow from the severed end of the umbilical cord. This sample is employed for blood typing so that a therapeutic agent such as RhoGAM can be administered, if necessary, to prevent the postpartum formation of antibodies to the $Rh^O$ (D) factor in the $Rh^O$ negative mother These steps are readily visualized with the aid of anatomical model 20.

Figure 11:
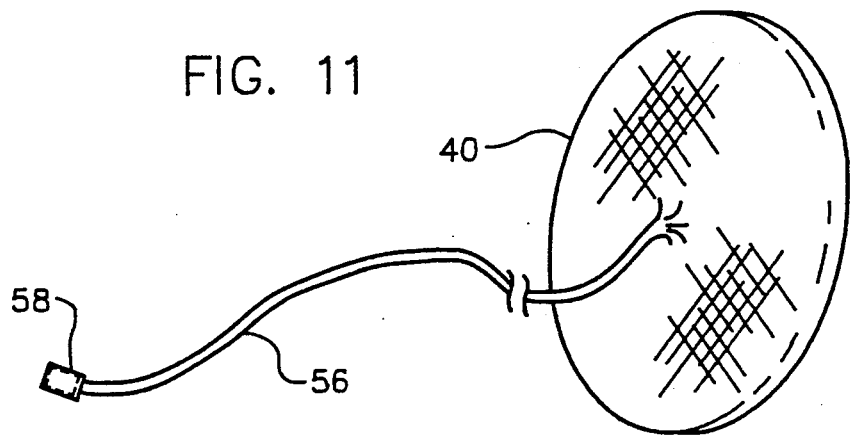
FIG. 11 depicts: (a) a simulated, placenta-representing anatomical model component as it appears after the baby has been delivered and the placenta removed from the uterine cavity, and (b) that part of the umbilical cord which remains attached to the placenta after the cord is severed.

Once the blood sample has been taken, the doctor reaches in the womb and removes the placenta, a step which anatomical model 20 also allows to be clearly visualized (see FIGS. 2 and 11).

Next, and as can also be readily simulated with anatomical model 20, the inside of the uterus is swabbed out with a sponge to remove any remaining fragments of placental tissue, the amniotic sac, etc. to avoid later bleeding and/or infection. Then, the uterus is taken out of the abdominal cavity, laid on the patient's abdomen 53 (see FIG. 12), and repaired; and its tone is assessed so that, if indicated, Pitocin can be administered to induce cramping and restore uterine tone.

The repair of the uterus is readily visualized with anatomical model 20 by closing previously opened zipper 50 (see FIG. 8).

With the uterus removed from the abdominal cavity, the fallopian tubes and ovaries can be readily visualized (see FIG. 12). At this juncture in an actual procedure, a tubal ligation may be performed if the patient is not to have additional children; and/or additional procedures such as a partial or full hysterectomy or removal of a diseased ovary or ovaries may be performed With anatomical model 20 configured as depicted in FIG. 12, the steps in these procedures can also be readily visualized, allowing one to repeat and become familiar with the steps and the instruments that are used.

Next, the uterus is replaced in the abdominal cavity and hemostats employed to proximate the edges of the visceral peritoneum. This layer of tissue is then sutured. Here again, the placing of the hemostats can be readily simulated with anatomical model 20, and the suturing of the bladder flap can equally well be simulated by closing zipper 48 (see FIG. 7).

The next step is to repair the outer peritoneal layer. This is done in the manner just described in conjunction with the bladder flap and is simulated with anatomical model 20 by closing zipper 46 (see FIG. 6).

Typically, at this point, a needle and sponge count will be made. This is another step which can easily and realistically simulated with anatomical model 20.

Next, the layer of muscle tissue is repaired. Often, this involves nothing more than pushing the two abdominus rectus muscles back together (see FIG. 5). Some surgeons, however, will put in one stitch to hold the edges of the muscles together until the connective tissue between them regenerates. This placing of this stitch is simulated with the hook-and-eye fastener 96 shown in FIG. 5.

After the layer 28 of muscle tissue has been dealt with, fascia 26 is repaired. Here again, hemostats or the like are employed to proximate the edges of the tissue before it is sutured so that a more even line of suturing can be provided. In anatomical model 20, this step is simulated by closing zipper 44 (see FIG. 4).

Finally, the adipose layer 24 and epidural layer 22 are repaired. Addsons clamps are typically employed to proximate the edges of the epidural tissue. This tissue is most often stapled instead of stitched so that the scar left from the procedure will be unobstrusive.

This step of repairing the adipose and epidural layers is simulated with anatomical model 20 by closing zipper 42 (see FIGS. 1 and 2). As in the other steps of the procedure, one can see how the instruments involved are actually employed as well as the steps involved.

It will be apparent from the foregoing detailed description and discussion that anatomical model 20 is totally reusable. Consequently, the caesarean section discussed in detail above or other procedure simulatable with the aid of model 20 can be repeated as many times as is considered appropriate or necessary.

The invention may be embodied in forms other than that disclosed above without departing from the spirit or essential characteristics of the invention. The present embodiment is therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. An anatomical model which comprises:
   means representing female reproductive organs in the abdominal cavity;
   means representing those layers of abdominal tissue which overlie said reproductive organs, said tissue layer-simulating means being configured and related to simulate an abdominal cavity;
   means which: (a) allow one to part each of the tissue layer-representing means and thereby simulate the actual dissection of the simulated layer of tissue in a surgical procedure requiring access to the reproductive organs, and (b) allow the thereby generated simulated incision to thereafter be closed to simulate the subsequent repair of the simulated layer of tissue;
   means simulating a uterus and located in the simulated abdominal cavity;
   means which allows one to: (a) part the uterus-simulating means of the model and thereby simulate that dissecting of the uterus used in the delivery of a baby by caesarean section an in other surgical procedures requiring access to the uterine cavity, and (b) simulate the subsequent repair of the uterus;
   a simulated baby; a simulated placenta; and a simulated umbilical cord attached, at opposite ends, to the simulated baby and the simulated placenta, said simulated baby, placenta, and umbilical cord being locatable in the uterine cavity provided by the simulated uterus and removable therefrom; and
   the simulated umbilical cord having means representing the vein and arteries present in an actual umbilical cord.

2. An anatomical model which comprises:
   means representing female reproductive organs in the abdominal cavity;
   means representing the epidural layer, the adipose tissue layer, the facia, the outer peritoneum, and the visceral peritoneum which overlie said reproductive organs, said tissue layer-simulating means being configured and related to simulate an abdominal cavity;
   means which: (a) allow one to part each of the tissue layer-representing means and thereby simulate the actual dissection of the simulated layer of tissue in a surgical procedure requiring access to the reproductive organs, and (b) allow the thereby generated simulated incision to thereafter be closed to simulate the subsequent repair of the simulated layer of tissue;
   means simulating a uterus and located in the simulated abdominal cavity;
   means which allows one to: (a) part the uterus-simulating means of the model and thereby simulate that dissecting of the uterus used in the delivery of a baby by caesarean section and in other surgical procedures requiring access to the uterine cavity, and (b) simulate the subsequent repair of the uterus;
   a simulated baby;
   a simulated placenta; and
   a simulated umbilical cord attached, at opposite ends, to the simulated baby and the simulated placenta;
   said simulated baby, placenta, and umbilical cord being locatable in the uterine cavity provided by the simulated uterus and removable therefrom.

3. An anatomical model as defined in claim 2 in which the simulated umbilical cord has two segments and means for disconnecting those segments to simulate the severing of the umbilical cord of aq baby delivered by caesarean section.

4. An anatomical model as defined in claim 2 in which said simulated baby is so related with respect to the simulated uterine cavity that it can be placed therein in a position representing a normal birth or in a position representing a breech or other abnormal presentation.

5. An anatomical model as defined in claim 2 in which the means for simulating the dissection of the epidural layer, the adipose tissue layer, the fascia, the outer peritoneum, and the visceral peritoneum and the subsequent repair of those structures comprise a zipper in each of the aforesaid tissue layer-representing means; and
   in which those zippers in the means simulating the epidural and adipose tissue layers, the fascia, and the visceral peritoneum generally overlie on another and are oriented along paths in which incisions are actually made in the course of a lower transverse incision.

6. An anatomical model as defined in claim 2 which has means located in said simulated abdominal cavity and simulating left and right ovaries.

7. An anatomical model as defined in claim 2 which has means simulating right and left fallopian tubes in the simulated abdominal cavity.

8. An anatomical model as defined in claim 2 which includes means in said abdominal cavity simulating a bladder and means simulating a uterus which is in correct anatomical relationship to said simulated bladder, said simulated uterus being removable from said simulated uterine cavity.

9. An anatomical model as defined in claim 2 in which each of the tissue layer-simulating means is so constructed, fabricated, dimensioned, and related that it is recognizable as the layer of tissue it represents.

10. An anatomical model which comprises:
    means representing those female reproductive organs in the abdominal cavity;
    means representing the epidural layer, the adipose tissue layer, the fascia, the outer peritoneum, and the visceral peritoneum which overlie said reproductive organs;
    means which: (a) allow one to part each of the tissue layer-representing means and thereby simulate the actual dissection of the simulated layer of tissue in a surgical procedure requiring access to the reproductive organs, and (b) allow the thereby generated simulated incision to thereafter be closed to simulate the subsequent repair of the simulated layer of tissue;
    the means for simulating the dissection of the foregoing anatomical structures and the subsequent repair of those structures comprise a zipper in each of the aforesaid tissue layer-representing means;
    those zippers in the means simulating the epidural and adipose tissue layers, the fascia, and the visceral peritoneum generally overlying one another and being oriented along paths in which incisions are actually made int he course of a lower transverse incision; and
    the zipper in that means representing the visceral peritoneum being oriented at a right angle relative to the other zippers, whereby all of said zippers are oriented in the same manner and are in the same locations as the incisions simulated by opening the zippers.

11. An anatomical model as defined in claim 10 which comprises:
   means simulating a uterus, said uterus-simulating means being configured to simulate a uterine cavity; and
   means which allows one to part said uterus-simulating means to thereby simulate the incision made in a uterus in the coarse of delivering a baby by caesarean section.

12. An anatomical model as defined in claim 11 in which the means which allows one to part the means simulating the uterus is a zipper, said zipper underlying and having the same orientation as those zippers in the means which simulate the epidural and adipose tissue layers, the fascia, and the peritoneum.

* * * * *